(12) United States Patent
Chen et al.

(10) Patent No.: US 11,881,186 B2
(45) Date of Patent: Jan. 23, 2024

(54) DETECTION METHOD AND DETECTION SYSTEM

(71) Applicant: Skyverse Technology Co., Ltd., Shenzhen (CN)

(72) Inventors: Lu Chen, Shenzhen (CN); Tengfei Liu, Shenzhen (CN); Pengbin Zhang, Beijing (CN); Song Zhang, Shenzhen (CN)

(73) Assignee: Skyverse Technology Co., Ltd., Shenzhen (CN)

( * ) Notice: Subject to any disclaimer, the term of this patent is extended or adjusted under 35 U.S.C. 154(b) by 199 days.

(21) Appl. No.: 17/441,411

(22) PCT Filed: Mar. 20, 2020

(86) PCT No.: PCT/CN2020/080419
§ 371 (c)(1),
(2) Date: Sep. 21, 2021

(87) PCT Pub. No.: WO2020/187319
PCT Pub. Date: Sep. 24, 2020

(65) Prior Publication Data
US 2022/0189426 A1     Jun. 16, 2022

(30) Foreign Application Priority Data
Mar. 21, 2019   (CN) .......................... 201910215621.4

(51) Int. Cl.
*G09G 5/10*       (2006.01)
*G09G 3/36*       (2006.01)
*G06T 7/90*       (2017.01)

(52) U.S. Cl.
CPC ............. *G09G 3/3607* (2013.01); *G06T 7/90* (2017.01)

(58) Field of Classification Search
CPC ......... G09G 3/3607; G06T 7/90; G06T 7/001; G06T 2207/10024; G06T 2207/30148; G06T 2207/30168; G06F 18/24
(Continued)

(56) References Cited

U.S. PATENT DOCUMENTS 7,706,606 B1 *   4/2010   Ruzon ................ H04N 1/40012
                                                          382/164
8,073,236 B2    12/2011   Peng et al.
(Continued)

FOREIGN PATENT DOCUMENTS

CN     101090083 A    12/2007
CN     101329281 A    12/2008
(Continued)

OTHER PUBLICATIONS

International Search Report for Application No. PCT/CN2020/080419, dated Jun. 28, 2020.

*Primary Examiner* — Thuy N Pardo
(74) *Attorney, Agent, or Firm* — MARSHALL, GERSTEIN & BORUN LLP

(57) ABSTRACT

The present disclosure discloses a detection method and a detection system. The detection method comprises: creating a plurality of template images based on a reference object, wherein the reference object includes a plurality of units, and the plurality of template images are unit images with different average grayscale values; calculating a first average grayscale value of a unit image to be detected; selecting a first template image from the plurality of template images based on the first average grayscale value, wherein a difference between an average grayscale value of the first template image and the first average grayscale value is smallest; performing color difference detection on the unit image to be detected based on the first template image. The present disclosure can select a template image whose grayscale (Continued)

value is similar to the grayscale value of a unit image to be detected to detect the unit, so that the difference between the unit image to be detected and the template image is smallest, thereby reducing the frequency of false detection and missed detection, and ultimately increasing the detection effect of the color difference detection.

10 Claims, 5 Drawing Sheets

(58) Field of Classification Search
USPC .................................. 345/690, 691, 692
See application file for complete search history.

(56) References Cited

U.S. PATENT DOCUMENTS

| | | | |
|---|---|---|---|
| 2006/0160608 A1* | 7/2006 | Hill | G07F 17/3293 463/25 |
| 2009/0238445 A1 | 9/2009 | Yang et al. | |
| 2013/0188866 A1* | 7/2013 | Obrador | G06V 20/10 382/165 |
| 2017/0205390 A1* | 7/2017 | Shaked | G01N 15/1468 |
| 2018/0049496 A1* | 2/2018 | Benefiel | B41M 5/24 |
| 2018/0092534 A1* | 4/2018 | Nabhan | G16H 30/20 |
| 2018/0190115 A1* | 7/2018 | Liu | G08G 1/166 |
| 2019/0122350 A1* | 4/2019 | Yang | G06T 5/003 |
| 2019/0180976 A1* | 6/2019 | Mack | G06T 7/49 |
| 2020/0077727 A1* | 3/2020 | Sights | D06B 11/0096 |
| 2020/0118594 A1* | 4/2020 | Oxholm | G06T 11/60 |
| 2020/0211813 A1* | 7/2020 | Mack | G01Q 30/02 |
| 2020/0320817 A1* | 10/2020 | Liu | G07D 11/28 |
| 2022/0341073 A1* | 10/2022 | Schultz | G06V 10/50 |

FOREIGN PATENT DOCUMENTS

| | | |
|---|---|---|
| CN | 107730493 A | 2/2018 |
| WO | WO-2008/068894 A1 | 6/2008 |

* cited by examiner

DETECTION METHOD AND DETECTION SYSTEM

FIELD OF THE DISCLOSURE

The present disclosure relates to the technical field of color difference detection, and in particular relates to a detection method and a detection system.

BACKGROUND

After the manufacturing process of the semiconductor wafer is completed, the semiconductor wafer (also known as wafer) needs to be detected, for example, the surface of the die of the wafer is detected whether there is a defect (such as a foreign material, a scratch, etc.) to confirm whether the product is qualified. The usual method is to first select a qualified wafer, select some qualified dies on this wafer, and then use these dies to generate a standard reference die image. During detection, the die image of each die to be detected is compared with the standard reference die image, if the grayscale value difference between the image of the die to be detected and the image of the standard reference die exceeds the predetermined threshold, it is considered that there is a defect on the die to be detected which then is identified for subsequent processing.

The know detection methods can meet the detection requirements of most conventional wafers, but due to the known process problems in the industrial production process, differences of the average grayscale values of different die images on the same wafer are often very big. For example, in the two die images shown in FIGS. 1a and 1b, the difference between average grayscale values of the two is very big, if the traditional standard reference image is continued to use, in the case of matching the standard die image with die images with different average grayscale values, when the grayscale scale difference between the two is large, problems such as matching errors or misalignment are easily to occur, which will affect subsequent detection.

SUMMARY

Since the known current color difference detection technology for wafers only generates a standard reference die image for the same type of wafers, all the die to be detected need to be compared with the standard reference die image. In order to compensate for the grayscale value difference between different die images of the same wafer in the prior art, the reference threshold setting range must be expanded, so that when the difference between the defect in the die image and the neighboring normal pixels thereof is not too large, the grayscale value difference between the die image and the standard reference die image is also very small, so it is easy to miss the defect with smaller contrast, or occur that the matching is inaccurate during the matching and alignment.

For the above problems, the first aspect of the present disclosure proposes a detection method, comprising:

creating a plurality of template images based on a reference object, wherein the reference object includes a plurality of units, and the plurality of template images are unit images with different average grayscale values;

calculating a first average grayscale value of a unit image to be detected;

selecting a first template image from the plurality of template images based on the first average grayscale value, wherein a difference between an average grayscale value of the first template image and the first average grayscale value is smallest; and performing color difference detection on the unit image to be detected based on the first template image.

In an embodiment according to the first aspect of the present disclosure, creating a plurality of template images based on a reference object comprises:

scanning the reference object to generate a reference object image, wherein the reference object image includes a plurality of unit images;

selecting one or several unit images from the plurality of unit images to form a first unit image set;

classifying the first unit image set based on a first average grayscale value interval to form one or more grayscale classes, wherein each grayscale class includes one or more unit images;

generating a corresponding average grayscale image based on all of unit images in each grayscale class; and forming the template image according to the average grayscale image of each grayscale class.

In an embodiment according to the first aspect of the present disclosure, forming a template image according to an average grayscale scale image of each grayscale scale class comprises:

the step of forming the template image according to the average grayscale image of each grayscale class comprises:

determining whether there is an average grayscale value difference between any number of average grayscale images of the corresponding average grayscale image generated for the reference object is smaller than a second grayscale value interval;

retaining any of the plurality of average grayscale images as a template image, when there is the average grayscale value difference is less than the second average grayscale value of the second grayscale value interval; or the step of forming the template image according to the average grayscale image of each grayscale class includes:

each average grayscale image being used as a template image.

In an embodiment according to the first aspect of the present disclosure, creating a plurality of template images based on a reference object comprises:

creating the plurality of template images based on a single reference object; or creating the plurality of template images based on at least two reference objects, wherein grayscale value ranges of the at least two reference objects at least partially non-overlap.

In an embodiment according to the first aspect of the present disclosure, classifying the first unit image set based on a first average grayscale value interval to form one or more grayscale classes comprises:

calculating an average grayscale value of each unit image of the first unit image set;

sorting the first unit image set based on the calculated average grayscale value of each unit image to generate an image sequence associated with the first unit image set; and in the image sequence, classifying the first unit image set based on the first average grayscale value interval, so that the differences between the average grayscale values of all of unit images of each grayscale class are within the first average grayscale value interval.

In an embodiment according to the first aspect of the present disclosure, performing color difference detection on the unit image to be detected based on the first template image comprises:

determining whether an average grayscale value difference between a pixel point of the first template image and the corresponding pixel point of the unit image to be detected exceeds a predetermined threshold; and determining that the unit image to be detected has a defect in a case where the average grayscale value difference exceeds the predetermined threshold.

For the above problems, the second aspect of the present disclosure proposes a detection system, comprising:

a creation module configured to create a plurality of template images based on a reference object, wherein the reference object includes a plurality of units, and the plurality of template images are unit images with different average grayscale values;

a calculation module configured to calculate a first average grayscale value of a unit image to be detected;

a selection module configured to select a first template image from the plurality of template images based on the first average grayscale value, wherein a difference between an average grayscale value of the first template image and the first average grayscale value is smallest; and a detection module configured to perform color difference detection on the unit image to be detected based on the first template image.

In an embodiment according to the second aspect of the present disclosure, the creating unit comprises:

a scanning unit configured to scan the reference object to generate a reference object image, wherein the reference object image includes a plurality of unit images;

a forming unit configured to select one or several unit images from the plurality of unit images to form a first unit image set;

a classifying unit configured to classify the first unit image set based on a first average grayscale value interval to form one or more grayscale classes, wherein each grayscale class includes one or more unit images;

a generating unit configured to generate a corresponding average grayscale image based on all of unit images in each grayscale class; and a storing unit is configured to form the template image according to the average grayscale image of each grayscale class.

In an embodiment according to the second aspect of the present disclosure, the storing unit is configured to:

determine whether there is an average grayscale value difference between any number of average grayscale images of the corresponding average grayscale image generated for the reference object is smaller than a second grayscale value interval;

retain any of the plurality of average grayscale images as a template image, when there is the average grayscale value difference is less than the second average grayscale value of the second grayscale value interval; or the storing unit is configured to:

use each average grayscale image as a template image.

In an embodiment according to the second aspect of the present disclosure, the creating unit is specifically configured to:

create the plurality of template images based on a single reference object; or create the plurality of template images based on at least two reference objects, wherein grayscale value ranges of the at least two reference objects at least partially non-overlap.

In an embodiment according to the second aspect of the present disclosure, the classification unit comprises:

a calculating sub-unit configured to calculate an average grayscale value of each unit image of the first unit image set;

a sorting sub-unit configured to sort the first unit image set based on the calculated average grayscale value of each unit image to generate an image sequence associated with the first unit image set; and a classifying sub-unit configured to classify the first unit image set based on the first average grayscale value interval in the image sequence, so that the differences between the average grayscale values of all of unit images of each grayscale class are within the first average grayscale value interval.

In an embodiment according to the second aspect of the present disclosure, the detection module comprises:

a first detecting unit configured to determine whether the average grayscale value difference between a pixel point of the first template image and the corresponding pixel point of the unit image to be detected exceeds a predetermined threshold; and a second detecting unit configured to determine that the unit image to be detected has a defect in a case where the average grayscale value difference exceeds the predetermined threshold.

The detection method and detection system disclosed herein can create a plurality of template images with different grayscale values for the die images with different grayscale values of the wafer, so that during the detection, a template image whose grayscale value is close to the average grayscale value of the current die image is selected by calculating the grayscale value of the current die image to match the template image with the die image to be detected to complete the subsequent detection.

BRIEF DESCRIPTION OF THE DRAWINGS

With reference to the accompanying drawings and the following detailed description, the features, advantages and other aspects of the various embodiments of the present disclosure will become more apparent. Here, several embodiments of the present disclosure are shown by way of example and not by way of limitation, in the drawings.

DETAILED DESCRIPTION

Figure 1A:
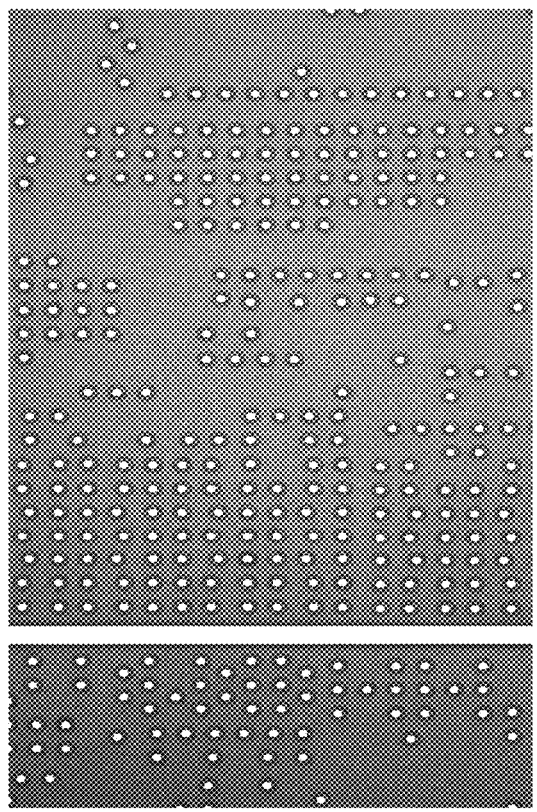
FIG. 1a is one of die images of the prior art of the detection method and detection system according to the present disclosure.
Figure 1B:
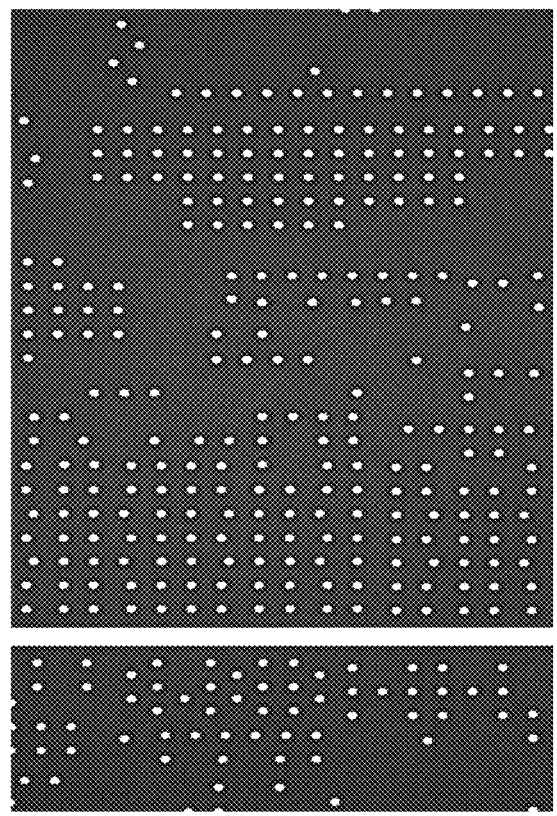
FIG. 1b is another one of die images of the prior art of the detection method and detection system according to the present disclosure.

Hereinafter, various exemplary embodiments of the present disclosure will be described in detail with reference to the accompanying drawings. The flowcharts and block diagrams in the drawings illustrate the possible implementation architecture, functions, and operations of the methods and devices according to various embodiments of the present disclosure. It should be noted that each block in the flowchart or block diagram may represent a module, program segment, or part of the code, and the module, program segment, or part of the code may include one or more executable instructions for implementing logic functions specified in various embodiments. It should also be noted that, in some alternative implementations, the functions marked in the blocks may also occur in a different order from the order marked in the drawings. For example, two blocks shown in succession may actually be executed substantially in parallel, or they may sometimes be executed in the reverse order, depending on the functions involved. It should also be noted that each block in the flowchart and/or block diagram, as well as the combination of the blocks in the flowchart and/or block diagram, can be implemented using a dedicated hardware-based device that performs the specified function or operation, or can be implemented using a combination of dedicated hardware and computer instructions.

The terms "comprising", "including" and similar terms used herein should be understood as open terms, that is, "comprising/including but not limited to", which means that other content may also be included. The term "based on" is "based at least in part on". The term "one embodiment" means "at least one embodiment"; the term "another embodiment" means "at least one additional embodiment", and so on.

The embodiments of the present disclosure mainly focus on the following technical problems: the known color difference detection technology for the object to be detected (for example, wafer) generally selects a qualified wafer, and selects the die images of some qualified dies on the wafer to generate the standard reference die images. During the actual detection, it is easy to cause the die image to be detected to mistakenly believe that there is a defect or miss a defect with a smaller contrast and other detection accuracy problems due to the grayscale value difference between the die image to be detected and the standard reference die image exceeding the preset threshold.

To solve the above-mentioned problems, the detection method and detection system disclosed in the present disclosure create corresponding template images for the die images with different grayscale values of the same type of wafer image, so that during the actual detection, the template image that is closest to the average grayscale value of the die image to be detected is used for matching detection, thereby greatly improving the detection result of color difference detection.

Figure 2:
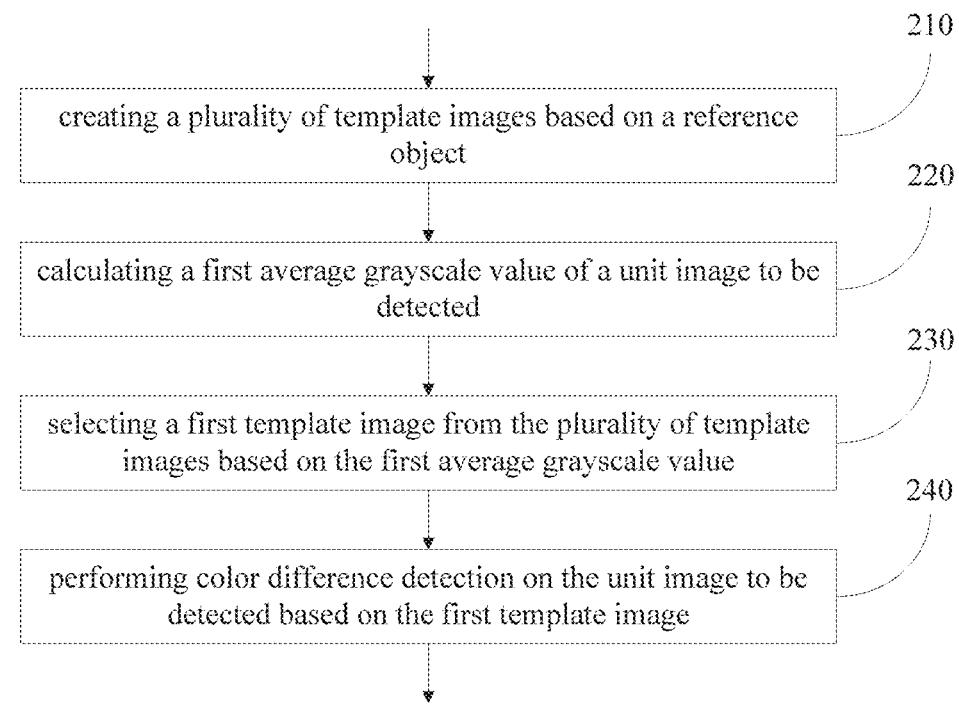
FIG. 2 is a flowchart of a detection method according to the present disclosure.
Figure 3:
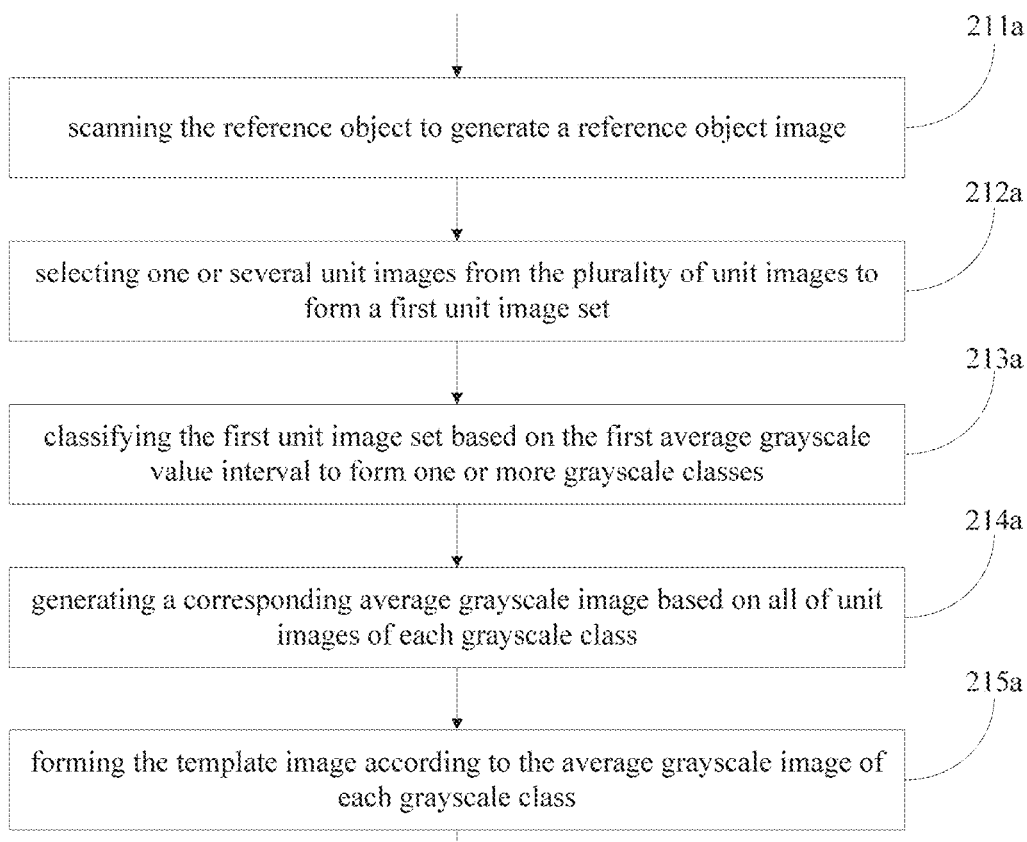
FIG. 3 is a flowchart of an embodiment of a detection method according to the present disclosure.

FIGS. 2 and 3 show exemplary flowcharts of the detection method. In this embodiment, the following steps are included:

Step 210: creating a plurality of template images based on a reference object. Specifically, in this embodiment, the plurality of template images are created based on a single reference object (for example, a single wafer) or at least two reference objects (for example, at least two wafers); wherein the wafer includes a plurality of dies, and the plurality of template images are unit images with different average grayscale values (that is, in this embodiment, die images).

In this embodiment, the specific operation of step 210 is shown in FIG. 3, which is specifically as follows:

Step 211a: scanning the entire block of the reference object to generate a reference object image. In this embodiment, the reference object image is a wafer image, which includes a plurality of die images.

Step 212a: selecting one or several unit images from the plurality of unit images to form a first unit image set. In this embodiment, the first unit image set, that is, the first die image set, includes one or several die images selected from the plurality of die images.

For example, in the entire wafer image, 100-300 die images are randomly selected or selected at intervals as the first die image set.

For ease of description, in this embodiment, 12 of the die images can be selected.

Step 213a: classifying the first unit image set based on the first average grayscale value interval to form one or more grayscale classes, wherein each grayscale class includes one or more die images. In this embodiment, the first unit image set, that is, the first die image set, the specific operation of step 213a is as follows:

Firstly, calculating the average grayscale value of each die image of the first die image set.

In this embodiment, the average grayscale values of the 12 die images are shown in Table 1:

TABLE 1

| Image Name | Average Grayscale Value |
|---|---|
| F00000067s0000 | 71.9 |
| F00000070s0000 | 71.4 |
| F00000073s0000 | 68.1 |
| F00000076s0000 | 69.2 |
| F00000091s0000 | 82.3 |
| F00000094s0000 | 71.4 |
| F00000097s0000 | 64.5 |
| F00000100s0000 | 54 |
| F00000115s0000 | 68.3 |
| F00000118s0000 | 77.5 |
| F00000121s0000 | 57.2 |
| F00000124s0000 | 46.8 |

Secondly, sorting the first die image set based on the calculated average grayscale value of each die image to generate an image sequence associated with the first die image set.

In this embodiment, the first column of the image sequence represents the image names sorted in ascending order according to the average grayscale value, and the second column is the average grayscale value corresponding thereto.

Thirdly, in the image sequence, classifying the first die image set based on the first average grayscale value interval, so that the differences between the average grayscale values of all of die images of each grayscale class are within the first average grayscale value interval.

In the present disclosure, the value of the first average grayscale value interval is any value from 5 to 20. In practical applications, the value of the first average grayscale value interval is determined according to the grayscale value range of the selected first die image set. For example, when the grayscale value range of the selected first die image set is 20-150, 10-130, the first average grayscale value interval can be set to be 10; when the grayscale value range of the selected first die image set is 10-160, the first average grayscale value interval can be set to be 20. In this embodiment, the first average grayscale value interval can be set to be 10, and the 12 die images in Table 1 can be divided into four grayscale classes as shown in Tables 2a-2d:

TABLE 2a

| | 1st Grayscale Class | |
|---|---|---|
| Image Name | | Average Grayscale Value |
| F00000124s0000 | | 46.8 |
| F00000100s0000 | | 54 |

TABLE 2b

| | 2$^{nd}$ Grayscale Class | |
|---|---|---|
| Image Name | | Average Grayscale Value |
| F00000121s0000 | | 57.2 |
| F00000097s0000 | | 64.5 |

TABLE 2c

| | 3$^{rd}$ Grayscale Class | |
|---|---|---|
| Image Name | | Average Grayscale Value |
| F00000073s0000 | | 68.1 |
| F00000115s0000 | | 68.3 |
| F00000076s0000 | | 69.2 |
| F00000070s0000 | | 71.4 |
| F00000094s0000 | | 71.4 |
| F00000067s0000 | | 71.9 |
| F00000118s0000 | | 77.5 |

TABLE 2d

| | 4$^{th}$ Grayscale class | |
|---|---|---|
| Image Name | | Average Grayscale Value |
| F00000091s0000 | | 82.3 |

Step 214a: generating a corresponding average grayscale image based on all of unit images of each grayscale class.

Figure 4A:
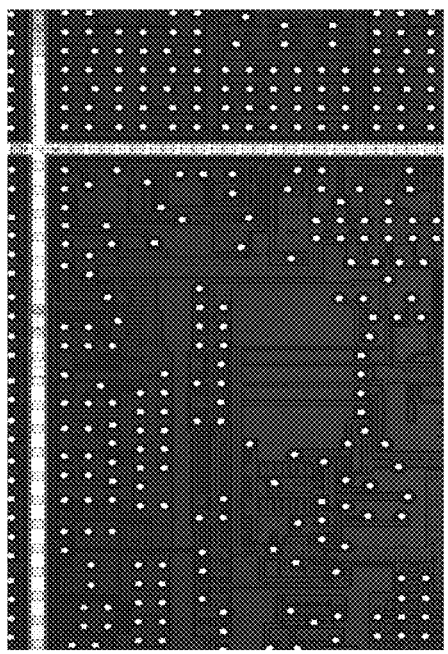
FIGS. 4a-4d are exemplary template images of the detection method according to the present disclosure.
Figure 4B:
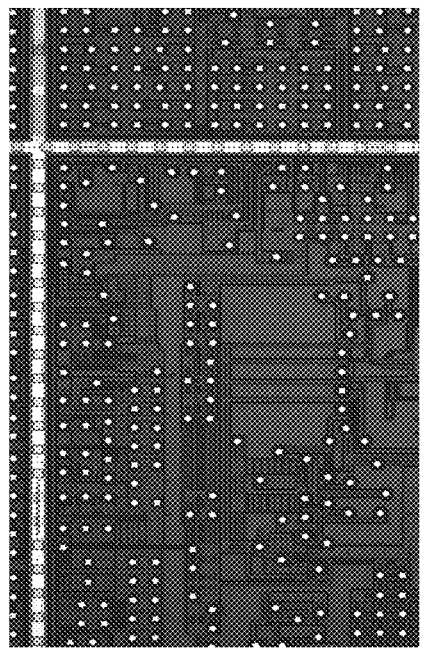
Figure 4C:
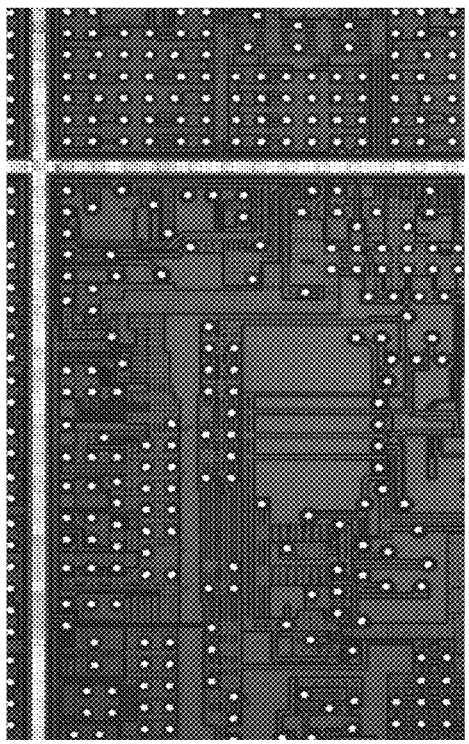
Figure 4D:
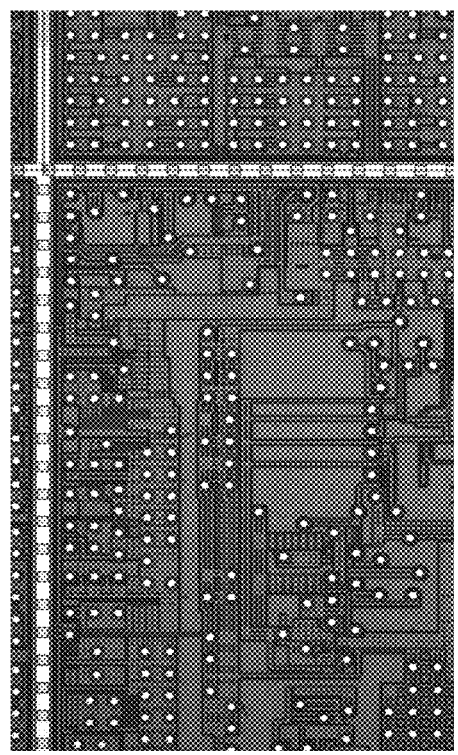

As shown in FIGS. 4a-4d, the corresponding average grayscale images are generated according to Tables 2a-2d, respectively. Specifically, for example, the corresponding average grayscale scale image (as shown in FIG. 4a) is generated using the average grayscale value of each pixel in the two images of the first grayscale class disclosed in Table 2a, and so on to the average grayscale images (for example, FIG. 4b, FIG. 4c, and FIG. 4d) corresponding to the second grayscale scale, the third grayscale scale, and the fourth grayscale scale respectively.

The average grayscale value of the average grayscale image of each grayscale class is generated (for example, using the average method or the median method). In this embodiment, the average method is used to calculate the average grayscale value of the average grayscale image of each grayscale class as follows:

Average Grayscale $\text{Value}_{the\ average\ grayscale\ image\ of\ the\ first\ grayscale\ class\ shown\ in\ FIG.\ 4a;} = 50.6;$ Average Grayscale $\text{Value}_{the\ average\ grayscale\ image\ of\ the\ second\ grayscale\ class\ shown\ in\ FIG.\ 4b;} = 61.1;$ Average Grayscale $\text{Value}_{the\ average\ grayscale\ image\ of\ the\ third\ grayscale\ class\ shown\ in\ FIG.\ 4c;} = 71.0;$ Average Grayscale $\text{Value}_{the\ average\ grayscale\ image\ of\ the\ fourth\ grayscale\ class\ shown\ in\ FIG.\ 4d;} = 82.3$ Step 215a: forming the template image according to the average grayscale image of each grayscale class.

In this embodiment, the average grayscale value set of the template image={50.6, 61.1, 71.0, 82.3}.

When creating a plurality of template images based on a single wafer, each average grayscale image can be stored as a template image, or any of the plurality of second average grayscale images are retained as a template image, in the case where the average grayscale value difference between any number of average grayscale images of all average grayscale images is less than a second average grayscale value of the second grayscale value interval.

In addition, in this embodiment, a plurality of template images are created based on a plurality of wafers (having at least partially non-overlapping grayscale value ranges). For example, if the grayscale value range of the first wafer is 30-80, and the grayscale value range of the second wafer is 50-120, the grayscale value range of the plurality of template images created can reach 30-120, thereby expanding the range of color difference detection.

After performing steps 211a-214a, step 215a specifically includes:

Firstly, determining whether there is an average grayscale value difference between any number of average grayscale images in the corresponding average grayscale image generated for the reference object is smaller than a second grayscale value interval.

Secondly, retaining any of the plurality of second average grayscale images as a template image, when there is the average grayscale value difference is less than a second average grayscale value of the second grayscale value interval.

In this embodiment, the average grayscale values corresponding to all of the average grayscale images generated by the first wafer and the second wafer are sorted, for example, the average grayscale value set of the average grayscale images created by the first wafer is golden1 {golden1_1, golden1_2, . . . , golden1_n1}, the average grayscale value set of the average grayscale images created by the second wafer is golden2{golden2_1, golden2_2, . . . , golden2_n2}, then the combined average grayscale value set of the average grayscale image includes n1+n2 average grayscale images.

It is determined whether there is a difference between any two or more average grayscale values of the n1+n2 average grayscale values is less than the second grayscale value interval, and if so, only any one of the average grayscale images with these average grayscale values is remained.

The above-mentioned remained average grayscale images are saved as template images, which can not only reduce the consumption of storage space, but also expand the color difference detection range, meanwhile improve the color difference detection efficiency and application range.

In addition, when a plurality of template images are created based on a plurality of wafers, all average grayscale images can also be saved as template images.

Step 210, forming the corresponding template image for die images with different grayscale values of the same wafer or different wafers to improve the subsequent detection accuracy.

Step 220: calculating the first average grayscale value of the die image to be detected.

Step 230: selecting a first template image from the plurality of template images based on the first average grayscale value, wherein the difference between the average grayscale value of the first template image and the first average grayscale value is the smallest.

For example, when the first average grayscale value of the die image to be detected is equal to 63, the template image (for example, FIG. 4b) corresponding to the second grayscale class with the average grayscale value=61.1 is selected from average grayscale value set of the template image as a first template image.

Step 240: performing color difference detection on the die image to be detected based on the first template image.

In this embodiment, the specific operation of step 240 is as follows:

First, determining whether the average grayscale value difference between pixel points of the first template image and the corresponding pixel points of the unit image to be detected exceeds a predetermined threshold;

Second, determining that the unit image to be detected has a defect in a case where the average grayscale value difference exceeds the predetermined threshold.

In the detection method implemented in this embodiment, although the average grayscale value of the die image to be detected is required during the detection process, and it is necessary to find the closest template image in the average grayscale value set of the template image for matching and comparing, the algorithm is simple, and the time-consuming detection is even negligible. In addition, using the template image which is closest to the average grayscale value of the die image to be detected to match and detect can greatly reduce the difference between the die image to be detected and the template image, thereby reducing the phenomenon of false detection and missed detection, and ultimately improving color difference detection effect.

Figure 5:
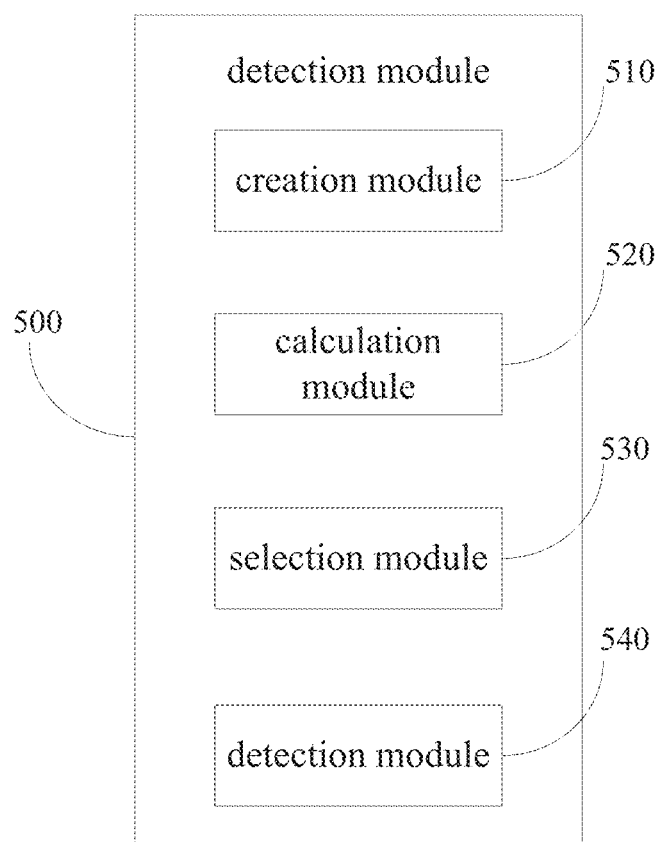
FIG. 5 is a schematic diagram of a detection system 500 according to the present disclosure.

FIG. 5 shows a schematic block diagram of a detection system 500 for implementing the methods shown in FIGS. 2 and 3, wherein the detection system 500 includes a creation module 510, a calculation module 520, a selection module 530, and a detection module 540.

In the present disclosure, the creation module 510 is configured to create a plurality of template images based on a reference object, wherein the reference object includes a plurality of units, and the plurality of template images are unit images with different average grayscale values. The calculation module 520 is configured to calculate a first average grayscale value of a unit image to be detected; the selection module 530 is configured to a first template image from the plurality of template images based on the first average grayscale value, wherein a difference between an average grayscale value of the first template image and the first average grayscale value is smallest; the detection module 540 is configured to perform color difference detection on the unit image to be detected based on the first template image.

Specifically, the creation module 510 includes a scanning unit, a forming unit, a classifying unit, a generating unit, and a storing unit, which can implement steps 211a-215a in FIG. 3 accordingly. In addition, the classifying unit includes a calculating sub-unit, a sorting sub-unit, and a classifying sub-unit, wherein the calculation sub-unit is configured to calculate an average grayscale value of each unit image of the first unit image set; the sorting sub-unit is configured to sort the first unit image set based on the calculated average grayscale value of each unit image to generate an image sequence associated with the first unit image set; a classifying sub-unit configured to classify the first unit image set based on the first average grayscale value interval in the image sequence, so that the differences between the average grayscale values of all of unit images of each grayscale class are within the first average grayscale value interval.

In addition, the detection module 540 includes a first detecting unit and a second detecting unit, wherein the first detection unit is configured to determine whether the average grayscale value difference between a pixel point of the first template image and the corresponding pixel point of the unit image to be detected exceeds a predetermined threshold; the second detection unit is configured to determine that the unit image to be detected has a defect in a case where the average grayscale value difference exceeds the predetermined threshold.

The detection system disclosed herein, on the one hand, can select the template image which is closest to the average grayscale value of the unit image to be detected to match and detect the unit image to be detected, to prevent the occurrence of false detection and missed detection, and to improve the accuracy of the color difference detection result; on the other hand, the detection algorithm disclosed herein is simple, the detection speed is fast, and the detection efficiency is improved compared with the existing color difference detection technology.

The foregoing are only optional embodiments of the embodiments of the present disclosure, and are not used to limit the embodiments of the present disclosure, It will be apparent to those skilled in the art that variations and modifications can be effected within the embodiments of the present disclosure. Any modification, equivalent replacement, improvement, etc. made within the spirit and principle of the embodiments of the present disclosure should be included in the protection scope of the embodiments of the present disclosure.

Although the embodiments of the present disclosure have been described with reference to several specific embodiments, it should be understood that the embodiments of the present disclosure are not limited to the specific embodiments disclosed. The embodiments of the present disclosure are intended to cover various modifications and equivalent arrangements within the spirit and scope of the appended claims. The scope of the appended claims accords with the broadest interpretation, so as to include all such modifications and equivalent structures and functions.

What is claimed is:

1. A detection method, wherein the detection method comprises:
   creating a plurality of template images based on a reference object, wherein the reference object includes a plurality of units, and the plurality of template images are unit images with different average grayscale values;
   calculating a first average grayscale value of a unit image to be detected;
   selecting a first template image from the plurality of template images based on the first average grayscale value, wherein a difference between an average grayscale value of the first template image and the first average grayscale value is smallest; and
   performing detection on the unit image to be detected based on the first template image including;
      determining whether an average grayscale value difference between a pixel point of the first template image and the corresponding pixel point of the unit image to be detected exceeds a predetermined threshold; and
      determining that the unit image to be detected has a defect in a case where the average grayscale value difference exceeds the predetermined threshold.

2. The detection method according to claim 1, wherein creating a plurality of template images based on the reference object comprises:
   scanning the reference object to generate a reference object image, wherein the reference object image includes a plurality of unit images;
   selecting one or several unit images from the plurality of unit images to form a first unit image set;
   classifying the first unit image set, based on a first average grayscale value interval, to form one or more grayscale classes, wherein each grayscale class includes one or more unit images;
   generating a corresponding average grayscale image based on all of unit images in each grayscale class; and
   forming the template image according to the average grayscale image of each grayscale class.

3. The detection method according to claim 2, wherein,
   the step of forming the template image according to the average grayscale image of each grayscale class comprises:
   determining whether there is an average grayscale value difference between any number of average grayscale images of the corresponding average grayscale image generated for the reference object is smaller than a second grayscale value interval;
   retaining anyone of the plurality of average grayscale images as a template image, when there is the average grayscale value difference is less than the second average grayscale value of the second grayscale value interval; or
   the step of forming the template image according to the average grayscale image of each grayscale class includes:
   using all average grayscale images as a template image.

4. The detection method according to claim 3, wherein creating the plurality of template images based on the reference object comprises:
   creating the plurality of template images based on a single reference object; or
   creating the plurality of template images based on at least two reference objects, wherein grayscale value ranges of the at least two reference objects at least partially non-overlap.

5. The detection method according to claim 2, wherein classifying the first unit image set based on the first average grayscale value interval to form one or more grayscale classes comprises:
   calculating an average grayscale value of each unit image of the first unit image set;
   sorting the first unit image set based on the calculated average grayscale value of each unit image to generate an image sequence associated with the first unit image set; and
   in the image sequence, classifying the first unit image set based on the first average grayscale value interval, so that the differences between the average grayscale values of all of unit images of each grayscale class are within the first average grayscale value interval.

6. A detection system, wherein the detection system comprises:
   a creation module configured to create a plurality of template images based on a reference object, wherein the reference object includes a plurality of units, and the plurality of template images are unit images with different average grayscale values;
   a calculation module configured to calculate a first average grayscale value of a unit image to be detected;
   a selection module configured to select a first template image from the plurality of template images based on the first average grayscale value, wherein a difference between an average grayscale value of the first template image and the first average grayscale value is smallest; and
   a detection module configured to perform detection on the unit image to be detected based on the first template image including;
      a first detecting unit configured to determine whether the average grayscale value difference between a pixel point of the first template image and the corresponding pixel point of the unit image to be detected exceeds a predetermined threshold; and
      a second detecting unit configured to determine that the unit image to be detected has a defect in a case where the average grayscale value difference exceeds the predetermined threshold.

7. The detection system according to claim 6, wherein the creation module comprises:
   a scanning unit configured to scan the reference object to generate a reference object image, wherein the reference object image includes a plurality of unit images;
   a forming unit configured to select one or several unit images from the plurality of unit images to form a first unit image set;
   a classifying unit configured to classify the first unit image set based on a first average grayscale value interval to form one or more grayscale classes, wherein each grayscale class includes one or more unit images;
   a generating unit configured to generate a corresponding average grayscale image based on all of unit images in each grayscale class; and
   a storing unit is configured to form the template image according to the average grayscale image of each grayscale class.

8. The detection system according to claim 7, wherein, the storing unit is configured to:
   determine whether there is an average grayscale value difference between any number of average grayscale images of the corresponding average grayscale image generated for the reference object is smaller than a second grayscale value interval;

retain any of the plurality of average grayscale images as a template image, when there is the average grayscale value difference is less than the second average grayscale value of the second grayscale value interval; or the storing unit is configured to:

use all average grayscale images as a template image.

9. The detection system according to claim 8, wherein the creation module is configured to:

create the plurality of template images based on a single reference object; or create the plurality of template images based on at least two reference objects, wherein grayscale value ranges of the at least two reference objects at least partially non-overlap.

10. The detection system according to claim 7, wherein the classifying unit comprises:

a calculating sub-unit configured to calculate an average grayscale value of each unit image of the first unit image set;

a sorting sub-unit configured to sort the first unit image set based on the calculated average grayscale value of each unit image to generate an image sequence associated with the first unit image set; and a classifying sub-unit configured to classify the first unit image set based on the first average grayscale value interval in the image sequence, so that the differences between the average grayscale values of all of unit images of each grayscale class are within the first average grayscale value interval.

* * * * *